(12) United States Patent
Kaufner

(10) Patent No.: US 10,209,268 B2
(45) Date of Patent: Feb. 19, 2019

(54) METHOD FOR DETERMINING A CORRECTED ROTATIONAL SPEED SIGNAL, AND ELECTRIC MOTOR ARRANGEMENT

(71) Applicant: SCHAEFFLER TECHNOLOGIES AG & CO. KG, Herzogenaurach (DE)

(72) Inventor: Benjamin Kaufner, Stegaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/769,249

(22) PCT Filed: Sep. 6, 2016

(86) PCT No.: PCT/DE2016/200418
§ 371 (c)(1),
(2) Date: Apr. 18, 2018

(87) PCT Pub. No.: WO2017/080547
PCT Pub. Date: May 18, 2017

(65) Prior Publication Data
US 2018/0306833 A1 Oct. 25, 2018

(30) Foreign Application Priority Data
Nov. 11, 2015 (DE) .................. 10 2015 222 202

(51) Int. Cl.
*G01P 3/48* (2006.01)
*G01P 21/02* (2006.01)
(Continued)

(52) U.S. Cl.
CPC ............ *G01P 3/48* (2013.01); *G01D 5/24476* (2013.01); *G01P 21/02* (2013.01); *G01D 5/145* (2013.01); *G01D 5/2448* (2013.01)

(58) Field of Classification Search
None
See application file for complete search history.

(56) References Cited

U.S. PATENT DOCUMENTS 5,377,295 A * 12/1994 Ueda ................. H02P 23/16
388/815
6,320,430 B1 11/2001 Blossfeld
(Continued)

FOREIGN PATENT DOCUMENTS

DE 4019001 A1 12/1991
DE 10133524 A1 1/2003
(Continued)

OTHER PUBLICATIONS

International Search Report for Application No. PCT/DE2016/200418, dated Dec. 6, 2016, 6 pages.

*Primary Examiner* — Jeffery S Zweizig
(74) *Attorney, Agent, or Firm* — Brooks Kushman P.C.

(57) ABSTRACT

A method of determining a corrected rotational speed signal for an electric motor, comprising determining a periodic rotational angle signal that has a periodic rotational angle error that is dependent on the rotational angle, determining a half period duration of an interference ripple of a raw rotational speed signal, averaging of at least one pair of sampled values of the raw rotational speed signal, converting a rotational angle signal to a digital raw rotational speed signal that includes an interference ripple, determining an average value in response to at least one pair of sampled values of the raw rotational speed signal, forming a correction value dependent on a sampling period duration and on a frequency of the interference ripple of the raw rotational speed signal for consideration of a discretization error, and forming the corrected rotational speed signal from a difference between the average value and the correction value.

19 Claims, 9 Drawing Sheets

(51) Int. Cl.
 *G01D 5/244* (2006.01)
 *G01D 5/14* (2006.01)

(56) References Cited

U.S. PATENT DOCUMENTS

| | | | | |
|---|---|---|---|---|
| 7,248,989 | B2 * | 7/2007 | Bae | G01P 3/48 |
| | | | | 702/142 |
| 9,260,036 | B2 * | 2/2016 | Walters | H02P 6/16 |
| 2004/0153780 | A1 | 8/2004 | Strohrmann et al. | |
| 2007/0043528 | A1 | 2/2007 | Bae | |
| 2018/0088145 | A1 * | 3/2018 | Kaufner | G01P 3/489 |

FOREIGN PATENT DOCUMENTS

| | | |
|---|---|---|
| DE | 10260862 A1 | 7/2004 |
| DE | 102011105502 A1 | 1/2012 |
| DE | 102015205772 B3 | 4/2016 |
| EP | 1091214 A2 | 4/2001 |

\* cited by examiner

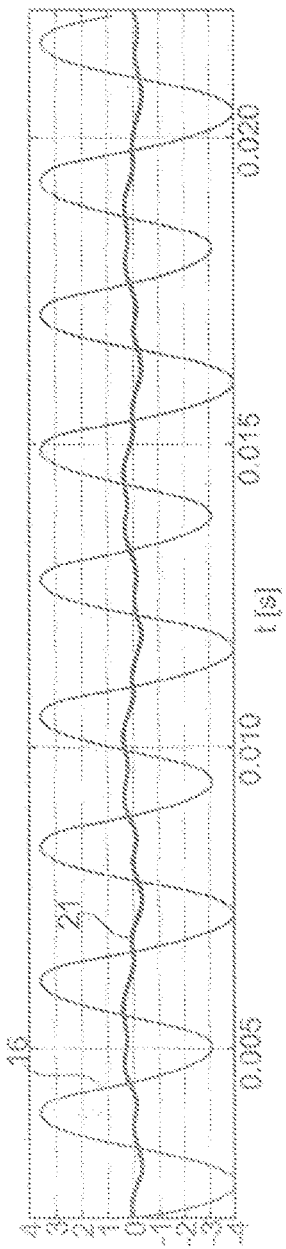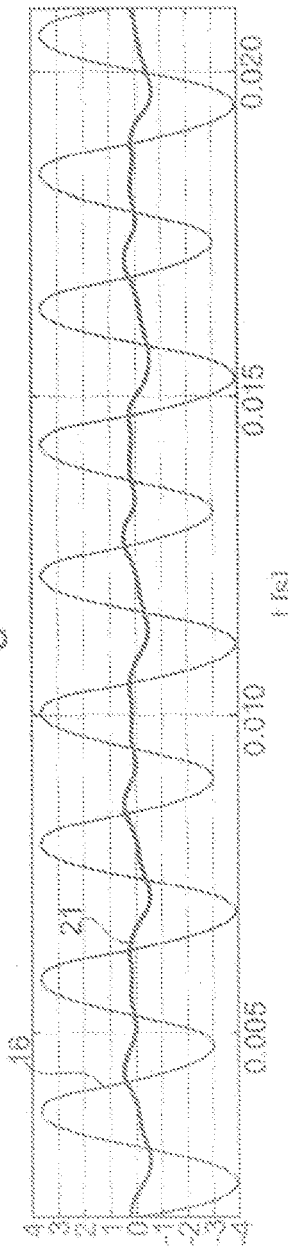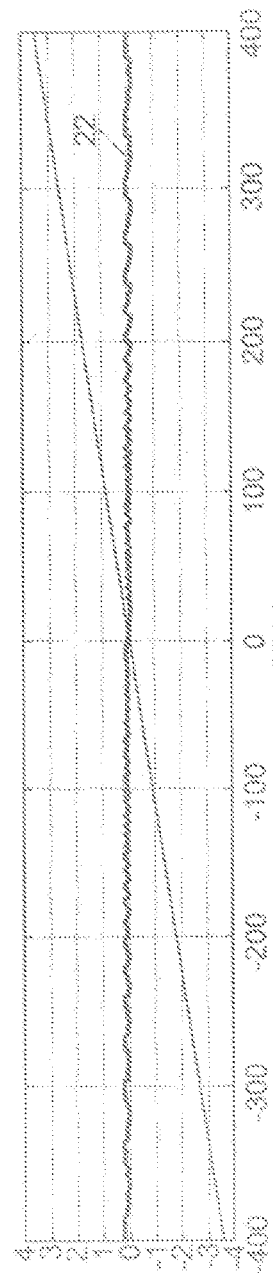

METHOD FOR DETERMINING A CORRECTED ROTATIONAL SPEED SIGNAL, AND ELECTRIC MOTOR ARRANGEMENT

CROSS-REFERENCE TO RELATED APPLICATIONS

This application is the U.S. National Phase of PCT/DE2016/200418 filed Sep. 6, 2016, which claims priority to DE 102015222202.0 filed Nov. 11, 2015, the entire disclosures of which are incorporated by reference herein.

TECHNICAL FIELD

The present disclosure relates primarily to a method for determining a corrected rotational speed signal. The method is in particular suitable for precisely determining a rotational speed of a rotary electric motor. The disclosure further relates to an electric motor arrangement in which the disclosed method is used.

BACKGROUND

A precise speed signal is required among other things wherever electric motors are used for a drive whose regulation is supposed to occur more precisely than with a conventional block commutation. The speed signal can be determined via an angle signal which can be recorded with a commutation sensor. The angle signal and hence also the speed signal can however have interference which prevents a precise regulation of the electric motor. In the prior art there are solutions with which the interference is supposed to be corrected by a previously determined correction value.

DE 102 60 862 A1 shows a method for correcting an angle or distance measuring sensor arrangement in which sinus or cosine shaped measuring signals are evaluated, which are gained by scanning a moved measuring object. The correction of the angle or phase error of the measuring signals takes place by deriving constants from a plurality of measuring signals for estimation and correction of the angle and phase error and/or the amplitude of the measuring signals.

DE 101 33 524 A1 describes a method for correction of a dynamic error of a sensor. This dynamic error is superimposed on the sensor signal, for example in the form of periodic fluctuations whose frequency and amplitude change continuously with the speed of the motor. For correction of the dynamic error the sensor-output signal is fed to a filter circuit and a correction circuit. The correction circuit obtains one or more of the filtered signals emitted by the filter circuit and generates a corrected sensor signal from information that it obtains from a comparison of the filtered signals with the unfiltered sensor output signal.

DE 10 2011 105 502 A1 shows a method for adjusting a phase offset between a rotor location sensor and a rotor location of an electrically commutated motor. In so doing, the rotor location sensor measures a position of the rotor of the motor which is driven during operation with a block commutation. This measured position is compared to an expected position. A phase offset is formed from the difference between the measured and expected position, said phase offset being used for driving the electrically commutated motor. The position of the rotor is measured with an absolute value rotor location sensor which is set into relation with a motor parameter that characterizes the expected position of the rotor.

SUMMARY

Proceeding from the prior art, the present disclosure addresses the problem of providing a precise rotary speed signal in order in particular to be able to more precisely regulate the rotary speed of electric motors.

The mentioned problem may be solved by a method according to the disclosure below, as well as by an electric motor arrangement according to the disclosure below.

The disclosed method may be suitable for use on electric motors where a very precise regulation is necessary. In accordance with the disclosure, a corrected rotary speed signal is determined which can be precisely determined permanently, thus in particular also during a rotation of a rotor of the electric motor.

In one step of the disclosed method, a periodic rotational angle signal is determined. A commutation sensor on the basis of a magnetic wheel transducer may be used as a signal transmitter for the rotational angle signal. The magnet wheel transducer can for example be equipped with several Hall sensors which are assigned to poles on a magnet wheel tightly connected to the rotor of the electric motor. The determined rotational angle signal has regular interference components at least in the form of a rotational angle error and if applicable a noise component. The rotational angle error is dependent on the rotational angle and consequently occurs periodically. The period duration of the rotational angle error is for example dependent on the type of commutation sensor, on which the period duration of the rotational angle signal is also dependent. The period duration of the rotational angle signal and the period duration of the rotational angle error are hence in direct proportion to one another, namely in a an integral proportion. The noise component of the rotational angle signal that is present if necessary occurs due to interference in the signal transmission. The rotational angle error is based in particular on system- or application-specific error characteristics of the commutation sensor.

The period duration of the rotational angle signal and the period duration of the rotational angle error can be determined as soon as a plurality of rotations has been executed.

In a further step of the inventive method the rotational angle signal is converted into a digital raw rotational speed signal. The digital raw rotational speed signal comprises a plurality of sampled values which can also be referred to as samples. The sampled values are determined by sampling with a sampling frequency. The sampled values hence have a temporal spacing to one another which is formed by a sampling period duration. The sampling frequency is the inverse value of the sampling period duration.

Due to the rotational angle error, the raw rotational speed signal has an interference ripple whose period duration corresponds to the period duration of the rotational angle error and in particular, is identical to. The rotational angle signal can in particular be converted into the raw rotational sped signal through a differentiation. Through the derivation of the measured rotational angle by time the rotational error present in the rotational angle signal is amplified, which due to its periodicity causes the mentioned interference ripple. The rotational angle error of the rotational angle error and hence also the form of the interference ripple of the raw rotational speed signal repeat periodically as opposed to an ideal value repeatedly caused by each magnetic pole pair of the commutation sensor. The form of the rotational angle error and the form of the interference ripple are in addition characterized by a point symmetry, which arises due to the fact that the rotational angle signal fluctuates by the ideal value; similar to a sinus-shaped interference signal on the rotational angle signal. The period duration of the raw rotational speed signal periodized by the interference ripple is in particular dependent on the type of commutation sensor and on its system- and application-specific error characteristics.

The digital raw rotational speed signal may have the same sampling frequency and hence also the same scanning period duration as the digital rotational angle signal.

In a further step of the disclosed method the half period duration of the interference ripple of the raw rotational speed signal is determined. To this end, at least a half rotation must have occurred, since the half period duration is determined from the sampled values and is not pre-determined. Since the sampled values and thus also the half period duration of the interference ripple of the raw rotational speed signal can change continually due to rotational speed changes, the half period duration may be determined continuously. However, to simplify, it is also possible to determine the period duration only at each jump of the rotational signal from $+\pi$ to $-\pi$.

In a further step of the disclosed method at least two of the sampled values of the raw rotational speed signal are determined whose temporal spacing is the determined half period duration of the interference ripple of the raw rotational speed signal, wherein, due to the temporal discretization of the raw rotational speed signal, this temporal spacing usually cannot be exactly the half period duration, but rather a temporal discretization error remains. Hence, the temporal spacing between the two sampled values is the half period duration of the interference ripple of the raw rotational speed signal plus the temporal discretization error, which may be large between the negative half sampling period duration and the positive half sampling period duration.

The more recent of the at least two selected sampled values may be the most recent of the provided sampled values.

For the adjustment of the interference ripple of the raw rotational speed signal two or more sampled values must be selected, which have a temporal spacing of exactly one half period length of the raw rotational speed signal. However, due to the discretization error said sampled values are not available in the general case.

Due to the periodicity and the point symmetry of the interference ripple of the raw rotational speed signal the respective two sampled values in principle suffice for averaging the raw rotational speed signal. An average value is determined through the averaging. The averaging of the sampled values may take place in the usual manner through addition of the two sampled values and division by the number of added sampled values. Forming the average value to a great extent eliminates the interference ripple in the raw rotational speed signal, wherein however due to the discretization error a small error remains.

In accordance with the disclosure a correction value dependent on the sampling period duration and on the frequency of the interference ripple of the raw rotational speed signal, said correction value enabling the consideration of the discretization error. The above described remaining error of the average value should be compensated with the correction value, resulting in the fact that the selected pair of sampled values is not exactly temporally spaced to the half period duration of the interference ripple of the raw rotational speed signal.

In accordance with the disclosure a corrected rotational speed signal is formed from a difference between the average value and the correction value. The corrected rotational speed signal is thus the average value minus the correction value. The mentioned difference can also be formed by a sum if the correction value is inverted.

One particular advantage of the disclosed method is that the application-specific error form of the signal representing the rotational speed of a electric motor is considered. The method permits a correction of the raw rotational speed signal determined by a commutation sensor by sample averaging and by consideration of the discretization error.

In carrying out the disclosed method the correction value is determined at least once. As a rule the correction value is determined continually, in order for example to regulate the rotational speed of a motor. If the rotational speed changes, the frequency of the interference ripple of the raw rotational speed signal and of the correction factor also change. The correction factor may be periodic with respect to the frequency of the interference ripple. The correction value may be a sawtooth-shaped graph with respect to the frequency of the interference ripple of the raw rotational speed signal. In this graph the maximum amplitude of the periods of the correction value may increase linearly with the frequency of the interference ripple of the raw rotational speed signal.

The correction value may have a minimum amount when the frequency of the interference ripple of the raw rotational speed signal is like a whole fraction of the sampling frequency. The correction value may be equal to zero when the frequency of the interference ripple of the raw rotational speed signal is equal to a whole fraction of the sampling frequency. The fraction may be a quarter or a whole fractions of a quarter.

The correction value may be formed by a product, wherein one of the factors of the product is the non-integral portion of a inverse value of a product from the frequency of the interference ripple of the raw rotational speed signal and the sampling period duration. The product of the frequency of the of the interference ripple of the raw rotational speed signal and the sampling period duration comprises a further factor 4.

The product forming the correction value may comprise of factors including the frequency of the interference ripple of the raw rotational speed signal, the sampling period duration, or the constant $\pi$. The product forming the correction value may comprise of factors including the frequency of the interference ripple of the raw rotational speed signal, the sampling period duration, and the constant $\pi$.

The correction value may be determined according to the following formula:

$$c(f) = \left(\left[\frac{1}{4 \cdot f \cdot T_{sample}}\right] - \frac{1}{4 \cdot f \cdot T_{sample}}\right) \cdot T_{sample} \cdot f \cdot \pi$$

In this formula c(f) stands for the correction value. The variable f stands for the frequency of the interference ripple of the raw rotational speed signal. The variable $T_{sample}$ stands for the sampling period duration. The square brackets [ . . . ] stand for the whole number function, which is also referred to as integer function.

As the disclosed method may be used for regulating the rotational speed of an electric motor, the rotational angle signal may be determined continuously. Also the further steps of the disclosed method may be continuously repeated, as soon as the electric motor has completed a first half rotation.

In one preferred embodiment of the disclosed method a commutation sensor is used to determine the rotational angle signal, which per whole rotation of the electric motor records a period of the rotational angle signal and hence two periods of the rotational angle error.

In preferred embodiments of the disclosed method the period duration of the rotational angle error is twice as great as the period duration of the rotational angle signal. The rotational angle error consequently has two full periods per rotation.

In preferred embodiments of the disclosed method the determination of the half period duration of the interference ripple of the raw rotational speed signal occurs by determining the period between two value range jumps of the rotational angle signal. The value range jumps may occur in each case occur after a complete rotation, especially when the rotational angle signal may jump from $+\pi$ to $-\pi$ or vice versa. This duration is the period duration of the rotational angle signal and may be the duration for a rotation, as there are exactly $2\pi\pi$, thus one rotation, between two jumps of $+\pi$ to $-\pi$. As the period duration of the rotational angle signal may be half as great as that of the rotational angle error and thus the interference ripple of the raw rotational speed signal, the determined period duration of the rotational angle signal must be quartered, in order to obtain the half period duration of the interference ripple of the raw rotational speed signal.

In an alternative preferred embodiment of the disclosed method the determination of the half period duration of the interference ripple of the raw rotational speed signal takes place by returning the determined and corrected rotational speed signal. Since at the beginning of the execution of the method no corrected rotational speed signal is available, in the first pass of the inventive procedural steps the previously determined and not yet corrected raw rotational speed signal must be used in order to determine the half period duration. In all following passes of the procedural steps the corrected values of the rotational speed signal are used in order to determine the half period duration of the interference ripple of the raw rotational speed signal. The raw rotational speed signal returns values in the form of rotation speeds. Hence the half period duration can be calculated from half of the reciprocals of the rotation speed.

In preferred embodiments of the disclosed method, more than two of the sampled values of the raw rotational speed signal are averaged. In the process, two of the sampled values are repeatedly averaged, wherein the respective selected two sampled values have a temporal spacing from the half period duration of the interference ripple of the raw rotational speed signal apart from the respective value of the discretization error. Another option is to average all sampled values of several pairs of the sampled values in one step, wherein the respective sampled values of the individual pairs have a temporal spacing from the half period duration of the interference ripple of the raw rotational speed signal apart from the respective value of the discretization error. One particular advantage of this preferred embodiment is that thus not only the interference ripple, but rather also the noise component of the raw rotational speed signal can be corrected. To this end more than five pairs of the sampled values may be selected, but may be fewer than 50, wherein the respective first sampled values of the pairs may be consecutive. The respective more recent sampled values of the pairs may be the most recent of the provided sampled values.

The disclosed rotational speed controllable electric motor arrangement comprises a rotary electric motor and a control unit. Through the control unit a corrected rotational speed signal of the electric motor can be provided. The control unit is configured to generate the corrected rotational speed signal by executing the disclosed method. The control unit may be configured to execute preferred embodiments of the disclosed method. In other respects the electric motor arrangement may also have the features that are specified in conjunction with the disclosed method.

The electric motor may be a drive motor of an electrically driven vehicle. The drive motor may be a wheel hub motor of an automobile.

BRIEF DESCRIPTION OF THE DRAWINGS

Further details, advantages and improvements of the disclosure arise from the following description of preferred embodiments of the disclosure, with reference to the drawing. The figures show the following:

FIG. 16 shows a diagram for representing a temporal course of a corrected rotational speed signal in a first frequency;

FIG. 17 shows a diagram for representing a temporal course of a corrected rotational speed signal in a second frequency;

FIG. 18 shows a diagram for representing the corrected rotational speed signal in the frequency range.

DETAILED DESCRIPTION

Figure 1:
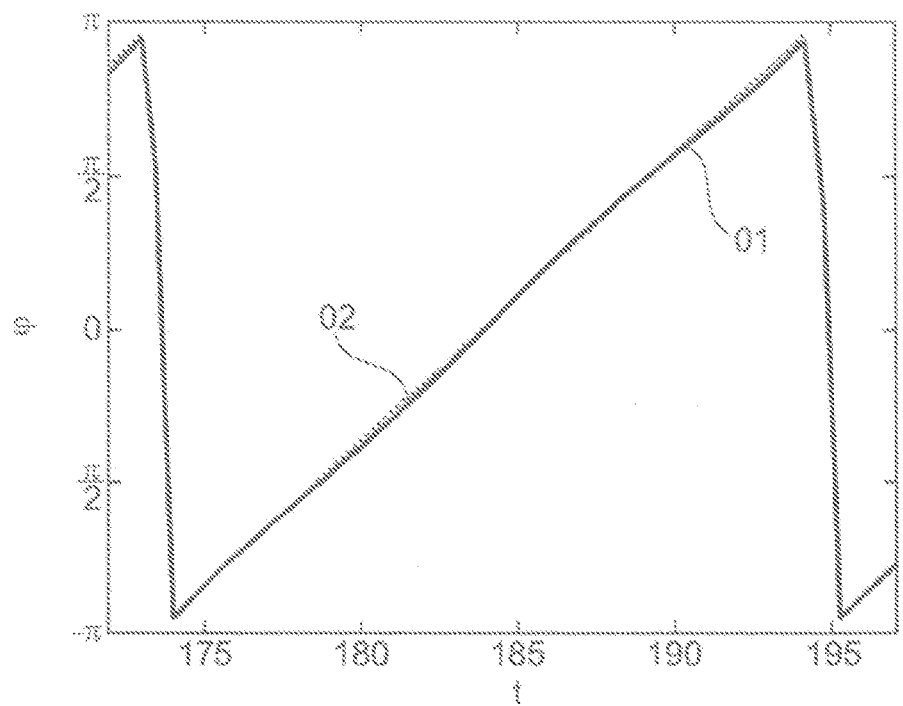
FIG. 1 shows a diagram for representation of an ideal rotational angle sensor measured by a commutation sensor.

FIG. 1 shows the course of a rotational angle signal 01 output from a commutation sensor, which shows the magnetic field angle in dependence on the time and is represented as a continuous line. By way of contrast, an ideal rotational angle signal 02 is shown as a dashed line. Per rotation from $-\pi$ to $+\pi$ the rotational angle signal 01 covers a full period. A comparison between the ideal rotational angle signal 02 with the measured rotational angle signal 01 shows that the commutation sensor acquires a small rotational angle error 03 (presented in FIG. 2), which, similar to the sinus-shaped interference signal floats on the rotational angle signal 01 around the ideal rotational angle signal 02.

Figure 2:
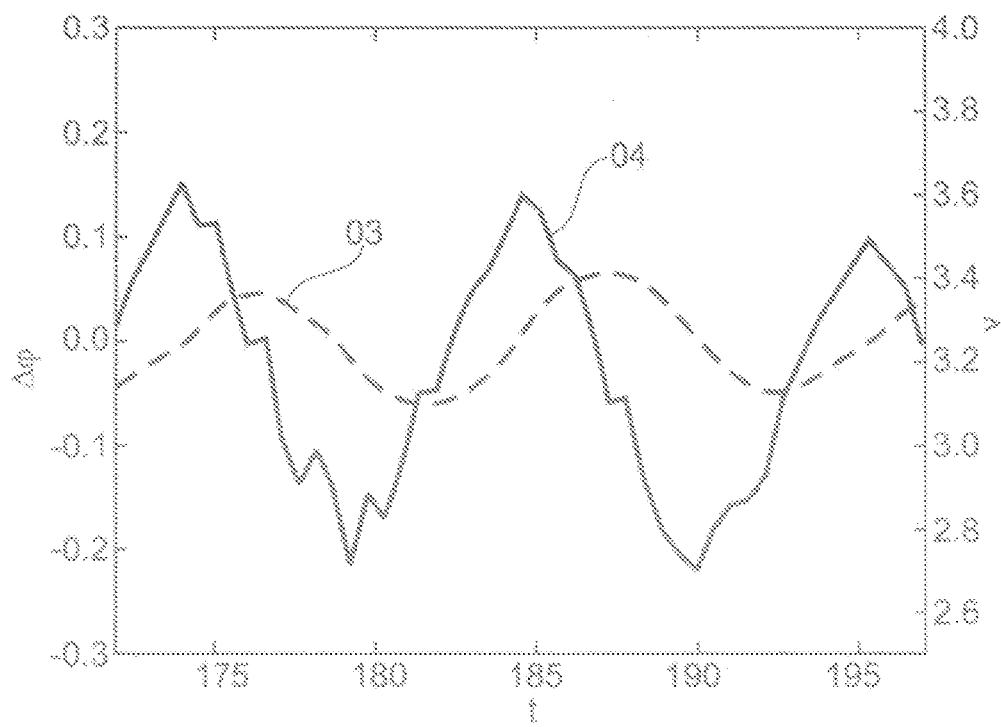
FIG. 2 shows a diagram for representation of a determined raw rotational speed signal and a course of a rotational angle error on the commutation sensor.

In FIG. 2 the rotational angle error 03 is shown as a magnetic field angular difference as a function of time. Further a raw rotational speed signal 04 is presented which in accordance with the disclosure is obtained by differentiation of the rotational angle signal 01. Here it can be seen that the ripple to be detected in the course of the rotational angle error 03 occurs increasingly in the raw rotational speed signal 04 through differentiation.

Figure 3:
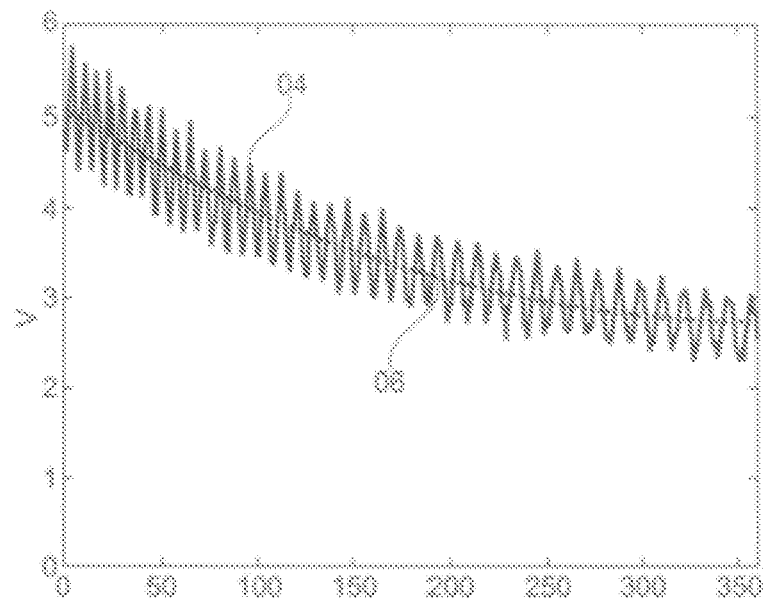
FIG. 3 shows a diagram for representation of the raw rotational speed signal in a speed change.

FIG. 3 shows a diagram for representing the raw rotational speed signal 04 in a rotational speed change. In comparison to an actual rotational speed 06 of the electric motor an error of about ±10% occurs in the case of the raw rotational speed signal 04 derived from the rotational angle signal 01 (shown in FIG. 1) of the commutation sensor. It can also be seen that the frequency of the interference ripple of the raw rotational speed signal 04 depends on the rotational speed.

In accordance with the disclosure a half period of the raw rotational speed signal 04 is determined, which may continue periodically in order to achieve an optimal error correction.

Figure 4:
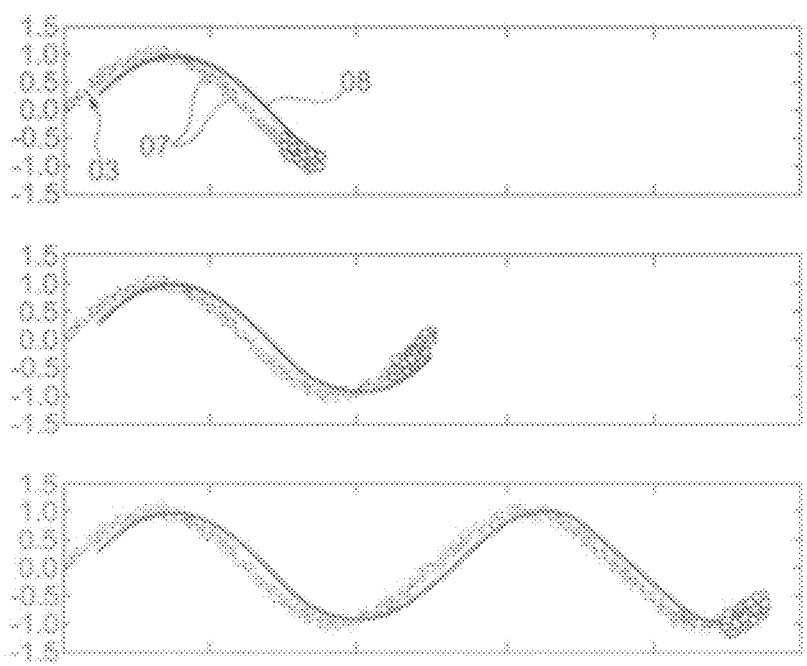
FIG. 4 shows three diagrams for representation of a moving averaging process according to the prior art.

FIG. 4 shows three diagrams for representing a moving averaging process according to the prior art. A correction of the raw rotational speed signal 04 (shown in FIG. 2) occurs via a moving average of a plurality of sampled values 07. The averaging here ensures a noise-free, moving averaged signal 08, while the interference ripple however is preserved.

Figure 5:
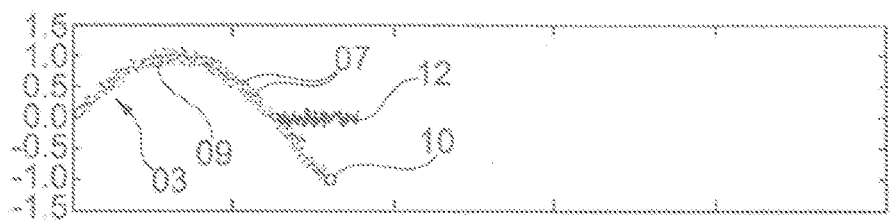
FIG. 5 shows three diagrams with an averaging via two sampled values of the raw rotational speed signal.
Figure 5:
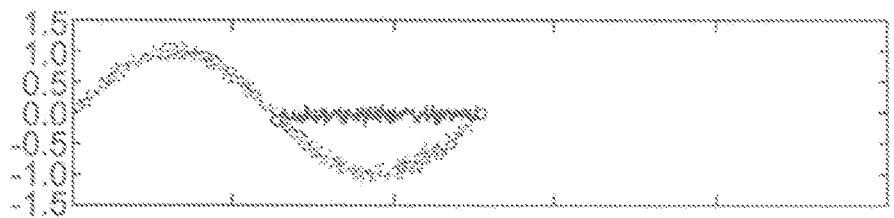
Figure 5:
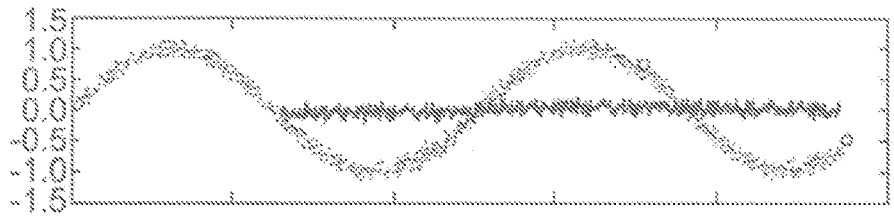

FIG. 5 shows three diagrams for representing an averaging. A first sampled value 09 and a second sampled value 10 are determined, which as far as possible are a half period duration of the rotational angle error 03 apart. This averaging leads to an averaged signal 12, in which the interference ripple is compensated, while initially, the noise remains virtually unchanged.

Figure 6:
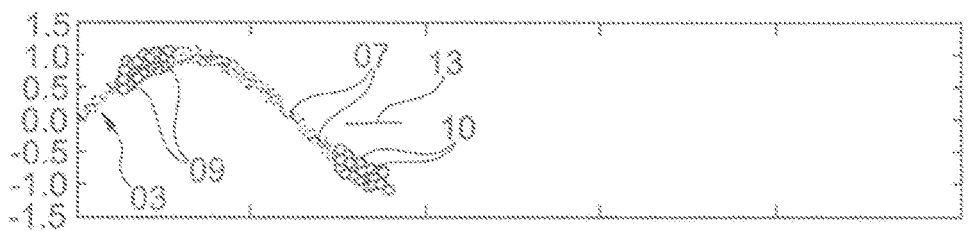
FIG. 6 shows three diagrams for representing the averaging of several pairs of the sampled values.
Figure 6:
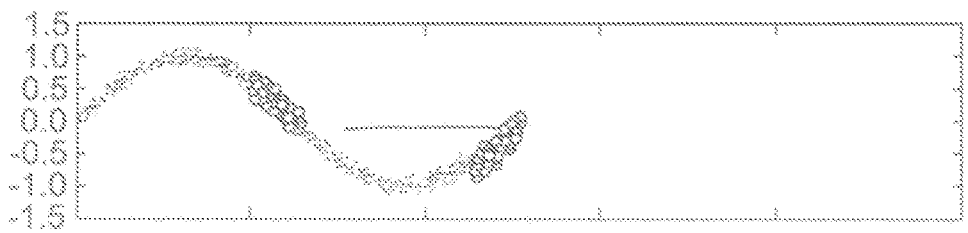
Figure 6:
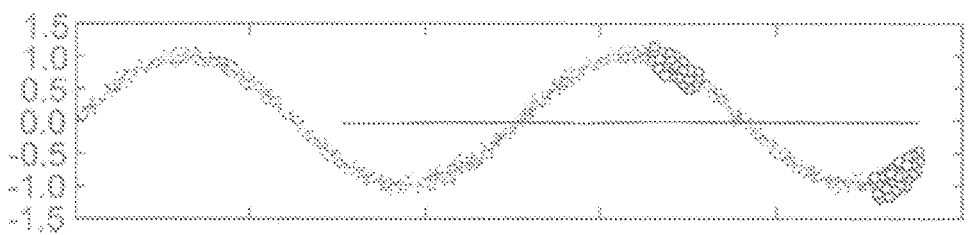

FIG. 6 illustrates a preferred embodiment of the disclosure, in which not only two of the sampled values 07 are determined, but rather in each case m, preferable m=10, of the pair sampled values 09, 10 are used, wherein these each have a distance of the half period duration of the rotational angle error 03 as precisely as possible. With this method a smoothed averaged signal 13 arises, which has neither the noise component nor the interference ripple.

Figure 7:
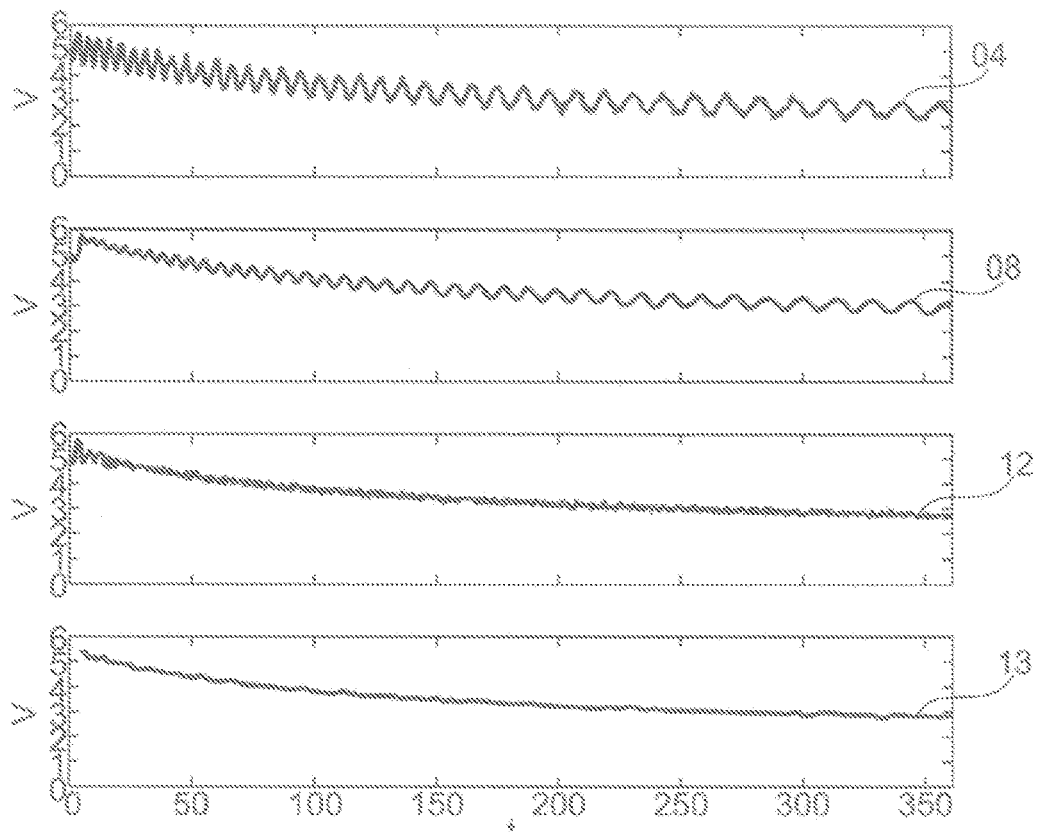
FIG. 7 shows four diagrams for comparative representation of the methods shown in FIG. 4 through FIG. 6.

A comparison of the four diagrams in FIG. 7 illustrates the difference of the results of the method shown in FIG. 4 through 6 in terms of real, measuring technology recorded rotational speed signals. While the method of the moving average with the interference ripple-free, moving averaged signal 08 as a result only eliminates the noise component of the raw rotational speed signal 04, averaging via two of the sample values with the noise-free averaged signal 12 as a result eliminates the interference ripple of the raw rotational speed signal 04. Averaging via m pairs of the sampled values 09, 10 with the smoothed signal 13 as a result removes both the noise component and the interference ripple of the raw rotational speed signal 04.

Furthermore, FIG. 7 shows that the time delay in the case of averaging via m pairs of the sampled values 09, 10 (shown in FIG. 6) with (T/2+m) is somewhat longer than in the case of averaging via a single pair of the sampled values 09, 10 (shown in FIG. 5) with (T/2) and is significantly longer than in the case of pure averaging. However, if a comparatively good signal were strived for with a method according to the prior art, the temporal filter delay would have to be a multiple of the period duration of the interference ripple of the raw rotational speed signal 04. However, if the delay constant is too great, the raw rotational speed signal 04 can no longer be used for dynamic reactions. Hence the speed-dependent averaging from two sampled values proposed by the disclosure is also the optimal delay method.

Figure 8:
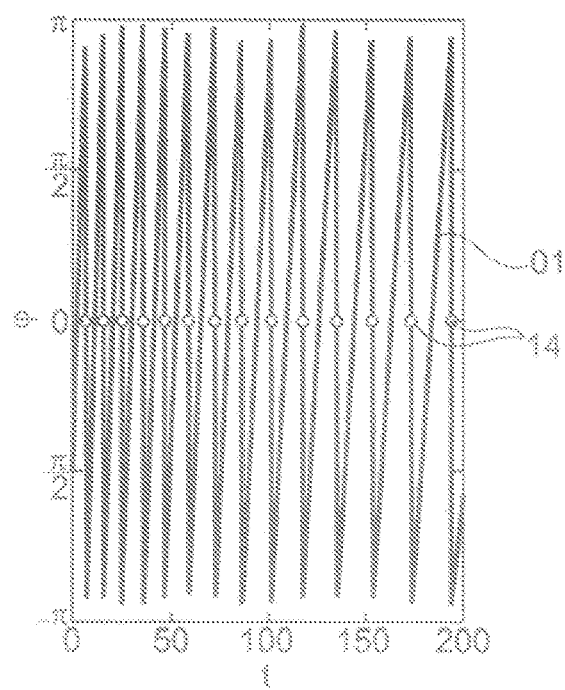
FIG. 8 shows a diagram with a rotational angle course.

FIG. 8 shows a diagram with the rotational angle signal course 01 of $-\pi$ to $+\pi$, wherein the magnetic field angle is shown as a function of time. Value range jumps 14 of $+\pi$ to $-\pi$ are characterized by points and in each case mark the time at which the electric motor begins a new rotation. Accordingly, the distance between two of the value range jumps 14 returns the period duration of the rotational angle signal 01. At each of the value range jumps 14 the rotational speed and thus the period can be re-determined, in order to determine the correct distance of the sampled values 09, 10 (shown in FIG. 5) to be used for averaging. From the course of the curve it is also evident that the speed change can be derived from the rotational angle signal 01.

Figure 9:
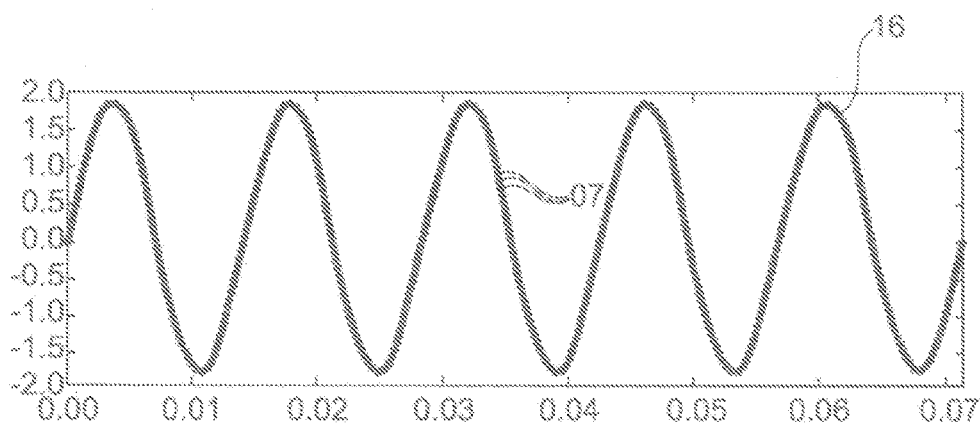
FIG. 9 shows a diagram for representing the raw rotational speed signal with a high sampling rate.

FIG. 9 shows a diagram for representing a digitized raw rotational speed signal 16, which was sampled at a high sampling rate, so that a plurality of the sampled values 07 is present. The selection of two sampled values 09, 10 shown in FIGS. 5 and 6, which are a half period duration of the rotational angle error 03 apart from one another in terms of time, is to a great extent possible with precision. However, due to the temporal discretization of the raw rotational speed signal 16 it regularly happens that the two sampled values 09, 10 to be selected do not exactly lie the half period duration of the rotational angle error 03 (shown in FIG. 5) apart from one another in terms of time.

In this representation, as in the following figures, the steady component of the illustrated signals is not shown.

Figure 10:
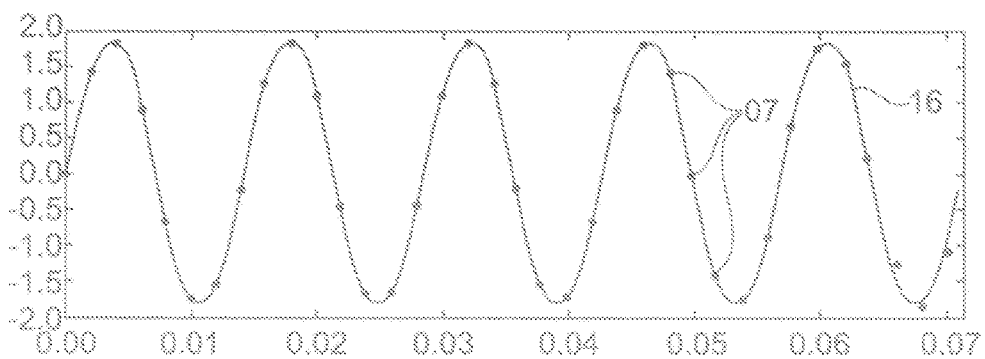
FIG. 10 shows the raw rotational speed signal shown in FIG. 9 with a lower sampling rate.

FIG. 10 shows the raw rotational speed signal 16 shown in FIG. 9 with a lower sampling rate. It is clear that the selection of two sampled values 09, 10 shown in FIGS. 5 and 6, which lie a half period duration of the rotational angle error 03 (shown in FIG. 5) or the interference ripple of the raw rotational speed signal 16 (shown in FIG. 5) are chronologically/temporally apart, is no longer sufficiently precisely possible/no longer possible with sufficient precision. Due to the temporal discretization of the raw rotational speed signal 16 it happens regularly that the two sampled values 09, 10 to be selected are the half period duration of the rotational angle error 03 (shown in FIG. 5) plus a temporal, not negligible discretization error apart.

Figure 11:
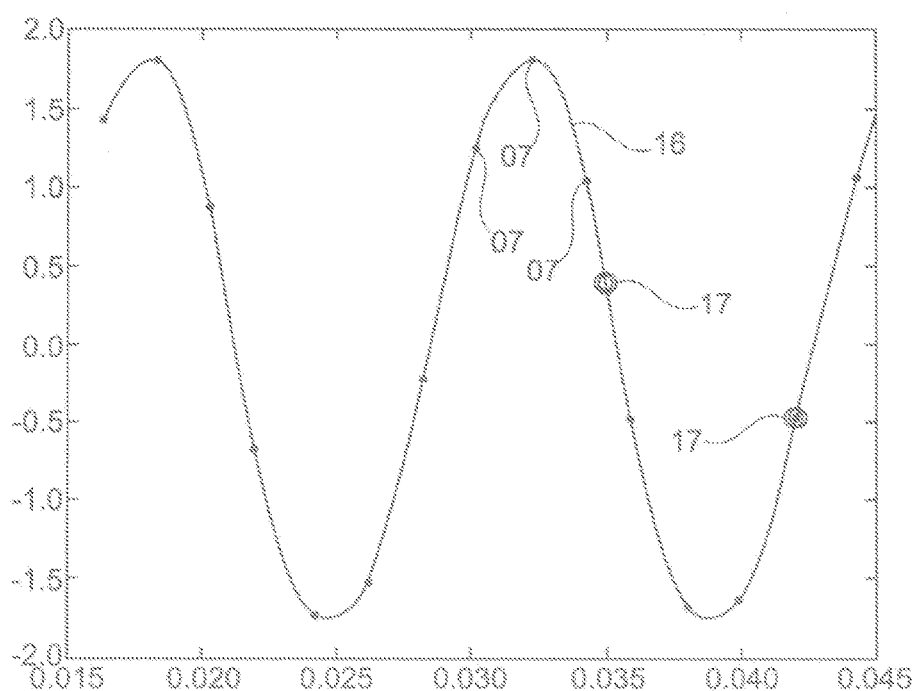
FIG. 11 shows the raw rotational speed signal shown in FIG. 10 with two ideally required sampling values.

FIG. 11 shows the raw rotational speed signal 16 shown in FIG. 10 with two ideally required sampling values 17, which lie temporally apart from one another exactly a half period duration of the rotational angle error 03 (shown in FIG. 5) or the interference ripple of the raw rotational speed signal 16 (shown in FIG. 5). The discretization error is the temporal distance/spacing between the older of the two ideally required sampled values 17 and the closest temporal of the sampled values 07.

Figure 12:
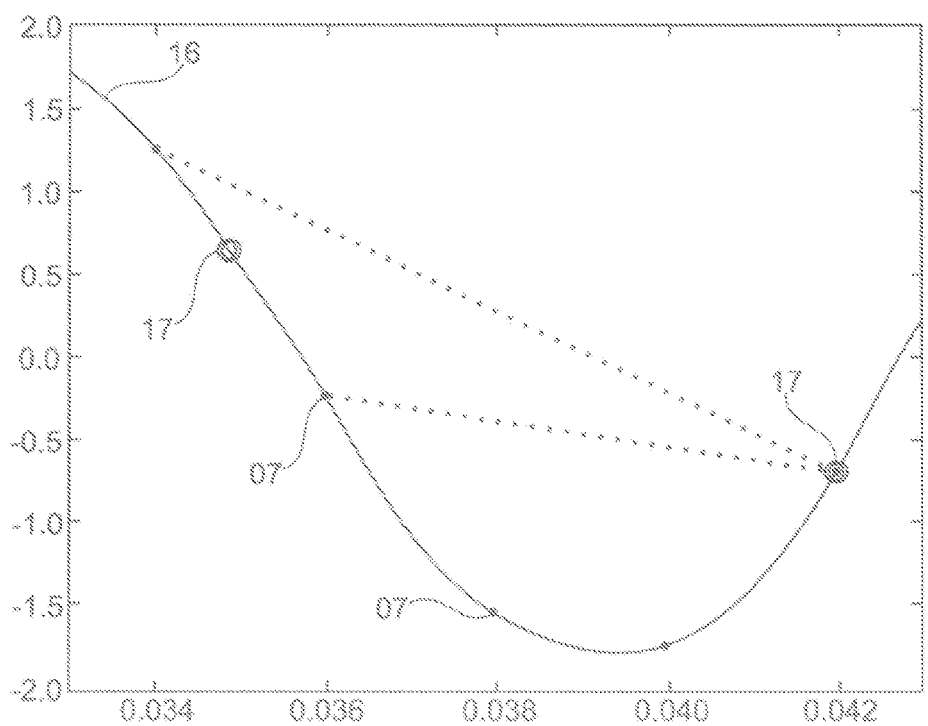
FIG. 12 shows a diagram for representing a discretization error occurring raw rotational speed signal shown in FIG. 11.

FIG. 12 shows in detail the discretization error illustrated in FIG. 11.

Figure 13:
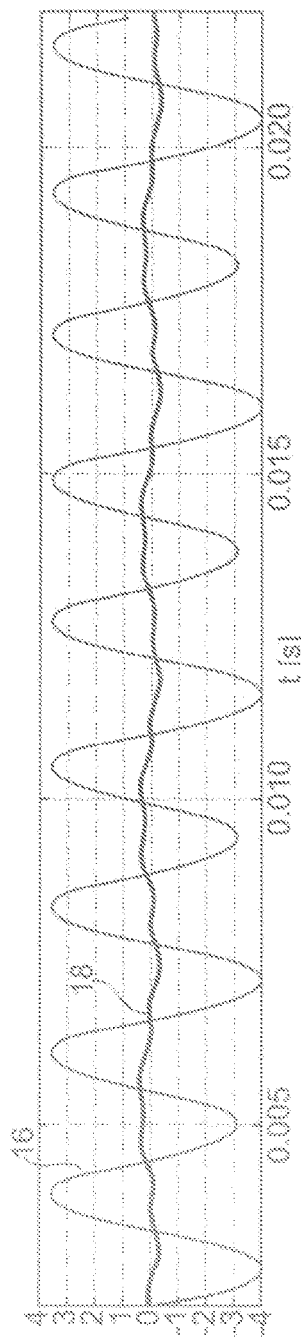
FIG. 13 shows a diagram for representing a temporal course of the average value in a first frequency.

FIG. 13 shows initially the raw rotational speed signal 16 represented in FIG. 9 in the case of a first frequency, which for example is 227 Hz and represents the rotational speed to be measured. Further the temporal course of the averaged value 18 is shown, which was determined according to the averaging process shown in FIG. 5. If the discretization error illustrated in FIG. 12 did not exist, the averaged value 18 would constantly equal zero in this representation, in which the steady component is not considered. However, due to the discretization error the average value 18 is unequal to zero and is temporally variable. The average value fluctuates in the case of the first frequency consistently around zero, so that it does not have an offset.

Figure 14:
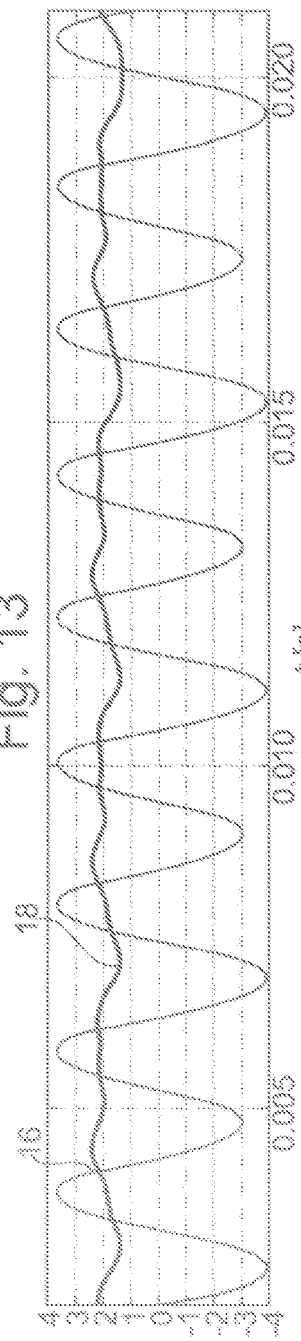
FIG. 14 shows a diagram for representing a temporal course of the average value in a second frequency.

FIG. 14 corresponds to the representation in FIG. 13 in the case of a second frequency, which by way of example is 239 Hz and represents the rotational speed to be measured. The average value 18, as in the case of the first frequency (shown in FIG. 13) is unequal to zero and temporally variable; however in the second frequency it additionally has a distinct offset.

Figure 15:
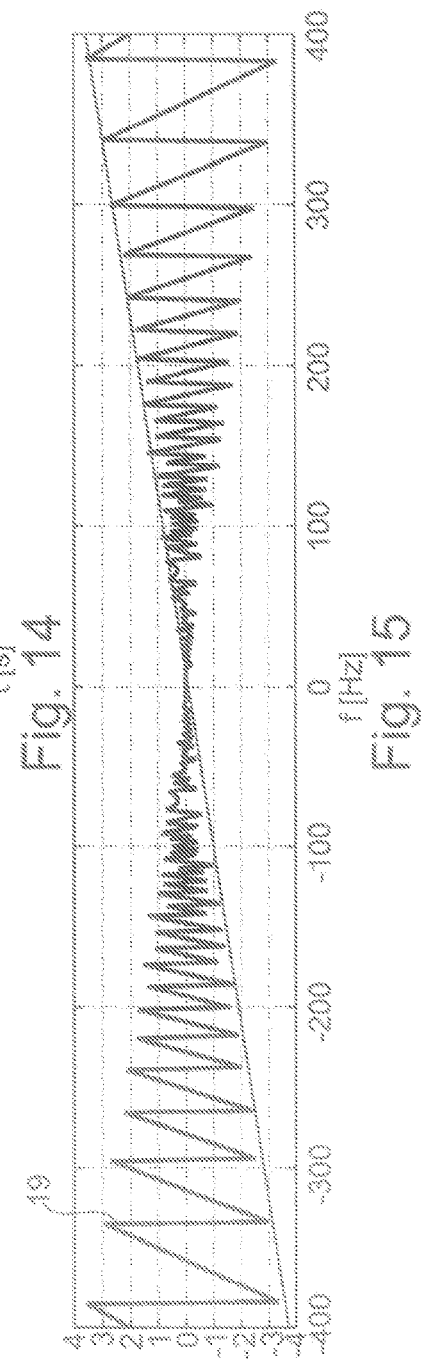
FIG. 15 shows a diagram for representing an average value in the frequency range.

FIG. 15 shows a course of an offset 19 of the average value 18 represented in FIGS. 13 and 14 in the frequency range. The frequency represents the rotational speed to be measured. The course of the offset 19 in the frequency range is sawtooth-shaped, wherein the maximum amplitude rises in the periods with increasing frequency.

In accordance with the disclosure offset 19 is eliminated by a correction value, which is deducted from the average value 18 (shown in FIGS. 13 and 14). This correction value can be derived in the following manner:

The averaging process represented in FIG. 5 shows that zeroes of the raw rotational speed signal 16 (shown in FIG. 10) have a temporal distance/spacing of a fourth of the period duration:

The variable n is a natural number unequal to zero. $T_{sample}$ stands for the sampling period duration. T stands for the period duration of the interference ripple of the raw rotational speed signal 16 (shown in FIG. 10).

The period duration T of the interference ripple of the raw rotational speed signal 16 (shown in FIG. 10) is the inverse value of the frequency f of the interference ripple of the rotational speed signal 16 (shown in FIG. 10), so that the above equation results in:

$$n \cdot \Delta T_{sample} = \frac{1}{4 \cdot f}$$

Zeroes $f_{errmin}$ of the offset 19 in the frequency range are thus:

$$f_{errmin} = \frac{1}{4 \cdot n \cdot T_{sample}}$$

The number of the current zero is hence:

$$n = \frac{1}{4 \cdot f_{errmin} \cdot T_{sample}}$$

Large values for n are not relevant, as they lead to smaller frequencies, in which the resulting offset 19 is negligible. If necessary, small values are also not relevant for n, if the associated great rotational speeds lie outside of the application.

Through the above equation the centers of the intervals are known. The associated maximum error $\Delta cp_{max}$ of the offset 19 is determined as follows:

$$\Delta \varphi_{max} = \frac{T_{sample}}{T} \cdot \pi$$

$$\Delta \varphi_{max} = T_{sample} \cdot f \cdot \pi$$

To determine the correction value, a distance $f_{abstand}$ of the frequency f of one of the zeroes must be determined:

$$f_{abstand} = \left[ \frac{1}{4 \cdot f \cdot T_{sample}} \right] - \frac{1}{4 \cdot f \cdot T_{sample}}$$

In this equation the square brackets stand for the whole number function.

The correction value c(f) arises as a product of the distance $f_{abstand}$ and the respective maximum error $\Delta cp_{max}$ of the offset 19:

$$c(f) = \left( \left[ \frac{1}{4 \cdot f \cdot T_{sample}} \right] - \frac{1}{4 \cdot f \cdot T_{sample}} \right) \cdot T_{sample} \cdot f \cdot \pi$$

This formula can be shortened to:

$$c(f) = T_{sample} \cdot f \cdot \pi \left[ \frac{1}{4 \cdot f \cdot T_{sample}} \right] - \frac{\pi}{4}$$

FIG. 16 shows the raw rotational speed signal 16 shown in FIG. 13 in the case of the first frequency, which for example is 227 Hz and represents the rotational speed to be measured. In addition, the temporal course of a corrected rotational speed signal 21 is presented, which is a difference from the average value 18 shown in FIG. 13 and the above explained correction value c(f). In the example shown here the correction value c(f)=0, since the average value 18 shown in FIG. 13 does not have an offset.

FIG. 17 shows the raw rotational speed signal 16 presented in FIG. 14 in the case of the second frequency. In addition the temporal course of the corrected rotational speed signal 21 is presented, which is a difference from the average value 18 shown in FIG. 14 and the above explained correction value c(f). In the example shown here, the correction value c(f)>0, since the average value 18 shown in FIG. 14 has a positive offset. The corrected rotational speed signal 21 has only a negligible offset.

FIG. 18 shows a course of an offset 22 of the corrected rotational speed signal 21 shown in FIG. 16 and FIG. 17 in the frequency range. Due to the correction, the offset 22 is only miniscule. The offset 19 shown in FIG. 15, which occurs as a consequence of the described discretization error, has thus been compensated to the greatest possible extent in accordance with the disclosure.

| | Reference List |
|---|---|
| 01 | measured rotational angle signal |
| 02 | ideal rotational angle signal |
| 03 | rotational angle error |
| 04 | raw rotational speed signal |
| 05 | — |
| 06 | Actual rotational speed |
| 07 | Sampled values |
| 08 | Moving averaged signal |
| 09 | First sampled value |
| 10 | Second sampled value |
| 11 | — |
| 12 | Averaged signal |
| 13 | Smoothed signal without noise component |
| 14 | Value range jump |
| 15 | — |
| 16 | Digitized raw rotational speed signal |

-continued

| Reference List | |
|---|---|
| 17 | Ideally required sampled values |
| 18 | Average value |
| 19 | Offset |
| 20 | — |
| 21 | Corrected rotational speed signal |
| 22 | Offset after the correction |

I claim:

1. A method for determining a corrected rotational speed signal, comprising:
   determining a periodic rotational angle signal that has a periodic rotational angle error dependent on the rotational angle;
   converting the rotational angle signal to a digital raw rotational speed signal in response to the rotational angle error having an interference ripple whose period duration corresponds to the period duration of the rotational angle error, wherein the digital raw rotational speed signal includes a plurality of sampled values temporally spaced by a sampling period duration;
   determining a half period duration of the interference ripple of the raw rotational speed signal;
   averaging of at least one pair of the sampled values of the raw rotational speed signal, whose temporal distance is the determined half period duration of the interference ripple of the raw rotational speed signal apart from a temporal discretization error, wherein an average value is obtained by the averaging;
   forming a correction value dependent on the sampling period duration and on a frequency of the interference ripple of the raw rotational speed signal for consideration of the discretization error; and
   forming the corrected rotational speed signal from a difference between the average value and the correction value.

2. The method of claim 1, wherein the correction value is periodical with respect to the frequency of the interference ripple of the raw rotational speed signal.

3. The method of claim 2, wherein the maximum amplitude of the periods of the correction value increases linearly with the frequency of the interference ripple of the raw rotational speed signal.

4. The method of claim 3, wherein the correction value has a sawtooth-shaped graph with respect to the frequency of the interference ripple of the raw rotational speed signal.

5. The method of claim 4, wherein the correction value has a minimum amount when the frequency of the interference ripple of the raw rotational speed signal is equal to a fourth of the raw rotational speed signal, wherein the frequency is an inverse value of the sampling period duration of the digital raw rotational speed signal.

6. The method of claim 5, wherein the correction value is formed by a product, wherein a factor of the product is formed by a non-integral portion of the inverses value of a product of the frequency of the interference ripple of the raw rotational speed signal and the sampling period duration.

7. The method of claim 6, wherein the further factors of the product forming the correction value are formed by the frequency of the interference ripple of the raw rotational speed signal are formed by the sampling period duration and by a constant $\pi$.

8. The method of claim 7, wherein the correction value is determined according to the following formula:

$$c(f) = \left(\left[\frac{1}{4 \cdot f \cdot T_{sample}}\right] - \frac{1}{4 \cdot f \cdot T_{sample}}\right) \cdot T_{sample} \cdot f \cdot \pi$$

wherein
   c(f) is the correction value,
   f is the frequency of the interference ripple of the raw rotational signal, and
   $T_{sample}$ is the sampling period duration.

9. The method of claim 8, wherein the corrected rotational speed signal is the corrected rotational speed signal of an electric motor which comprises a commutation sensor, wherein the determining of the periodic rotational angle signal of the electric motor takes place with assistance of the commutation sensor.

10. An electric motor arrangement, comprising:
    a rotary electric motor; and
    a control unit, the control unit configured to:
       determine a periodic rotational angle signal that has a periodic rotational angle error dependent on the rotational angle;
       convert the rotational angle signal to a digital raw rotational speed signal in response to the rotational angle error having an interference ripple whose period duration corresponds to the period duration of the rotational angle error, wherein the digital raw rotational speed signal includes a plurality of sampled values temporally spaced by a sampling period duration;
       determine a half period duration of the interference ripple of the raw rotational speed signal;
       average at least one pair of the sampled values of the raw rotational speed signal, whose temporal distance is the determined half period duration of the interference ripple of the raw rotational speed signal apart from a temporal discretization error, wherein an average value is obtained by the averaging;
       form a correction value dependent on the sampling period duration and on a frequency of the interference ripple of the raw rotational speed signal for consideration of the discretization error; and
       form a corrected rotational speed signal from a difference between the average value and the correction value; and
       output the corrected rotational speed signal.

11. The electric motor arrangement of claim 10, wherein the electric motor is a drive motor of an electrically driven vehicle.

12. The electric motor arrangement of claim 11, wherein the drive motor is a wheel hub motor.

13. A method of determining a corrected rotational speed signal for an electric motor, comprising:
    determining a periodic rotational angle signal that has a periodic rotational angle error that is dependent on the rotational angle;
    determining a half period duration of an interference ripple of a raw rotational speed signal;
    averaging of at least one pair of sampled values of the raw rotational speed signal;
    converting a rotational angle signal to a digital raw rotational speed signal that includes an interference ripple;
    determining an average value in response to at least one pair of sampled values of the raw rotational speed signal;

forming a correction value dependent on a sampling period duration and on a frequency of the interference ripple of the raw rotational speed signal for consideration of a discretization error; and forming the corrected rotational speed signal from a difference between the average value and the correction value.

14. The method of claim 13, wherein the determination of the half period duration of the interference ripple of the raw rotational speed signal occurs by determining the period between two value range jumps of the rotational angle signal.

15. The method of claim 13, wherein the period duration of the rotational angle error is twice as great as the period duration of the rotational angle signal.

16. The method of claim 13, wherein the determining of the half period duration of the interference ripple of the raw rotational speed signal occurs by determining a period between two value range jumps of the rotational angle signal.

17. The method of claim 13, wherein the determining of the half period duration of the interference ripple of the raw rotational speed signal occurs by returning a determined rotational speed signal and corrected rotational speed signal.

18. The method of claim 13, wherein the correction value is periodical with respect to a frequency of the interference ripple of the raw rotational speed signal.

19. The method of claim 13, wherein maximum amplitude of the periods of the correction value increases linearly with the frequency of the interference ripple of the raw rotational speed signal.

* * * * *